Jan. 27, 1970

J. E. SOUKERAS 3,491,723

CLOCKED ANIMAL FOOD DISPENSER

Filed Sept. 22, 1967

JOHN E. SOUKERAS
INVENTOR.

BY *Norman G. Chalfin*

AGENT.

United States Patent Office 3,491,723
Patented Jan. 27, 1970

3,491,723
CLOCKED ANIMAL FOOD DISPENSER
John E. Soukeras, P.O. Box 2403,
Las Vegas, Nev. 89104
Filed Sept. 22, 1967, Ser. No. 669,755
Int. Cl. A01k 5/00
U.S. Cl. 119—51.12                3 Claims

ABSTRACT OF THE DISCLOSURE

A timed weight discharging clock is arranged to unlock a door of an enclosure to expose food for an animal after an interval determined by the rate of discharge of the weighting material. Sand or the melting of a prefrozen ice pack produce the discharging weight.

BACKGROUND OF THE INVENTION

It is frequently necessary in the operation of some households which include pets, such as dogs or cats, for the householders to leave their pets alone for a period of time. In order to provide food for the animal at an appropriate feeding time it is necessary to arrange some way in which the food can be dispensed to the animal at a suitable interval after the householder has left.

THE PRESENT INVENTION

For the simplest form of dispenser I have devised a weight-loss clock type of locked chamber. The weight loss clock device comprises a lever forming a hasp at one end and a cup on the other end. The cup is positioned under a hopper which may be filled with a fine powder or sand or, alternatively, the hopper may be filled with ice. The rate of discharge of the sand or powder from the hopper operates as a clock to establish the time of release of the hasp lock. In the alternative form, a cup of water has been previously frozen and placed in the hopper. A small hole in the cup permits the water, resulting from the melted ice, to drip into a cup on the lever arm. As the cup on the lever arm fills with water it is weighted down to lift the hasp end thereof to release a door in the chamber. When the door falls, food in a plate slides down a ramp into accessible view so the animal may partake of it. The size of the cup of frozen water and the location of the fulcrum of the lever arm will determine the time interval before which the hasp lock end of the lever arm is raised to release the door of the chamber and to discharge the prepared animal food.

A feature of the invention is the fact that it may be made of any suitable material but is preferably made of easily assembled folded pasteboard components for economy.

The food chambers, according to my invention, may be arranged in a row with interconnecting release mechanisms coupled with the hasp-cup lever arm to that particular adjacent units may be actuated in a sequence after predetermined intervals.

A further feature of the invention is the ice-clock. While sand clocks have been known in the past no ice-clocks have been known. The advantage of the ice clock is that when the melting rate is known, fairly accurate timing for the food dispenser action can be anticipated. The choice of timing interval can be established by the size of ice cup set into the hopper for dripping into the lever arm cup to release the hasp locked door.

IN THE DRAWINGS

Figure 3:
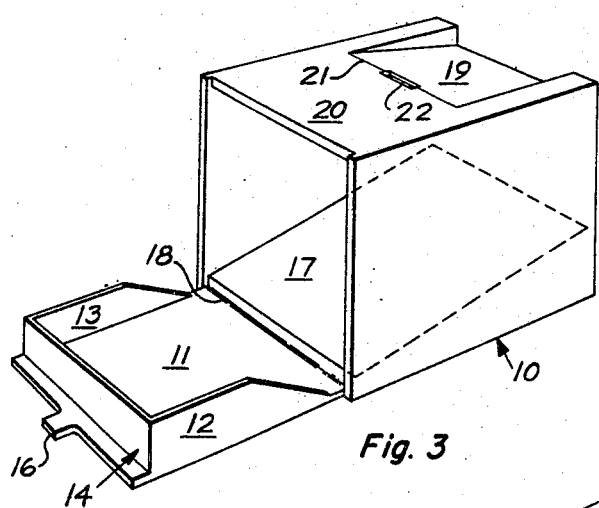
Figure 4:
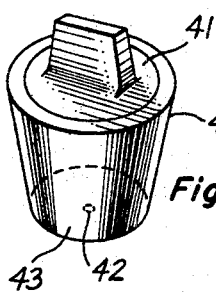
Figure 5:
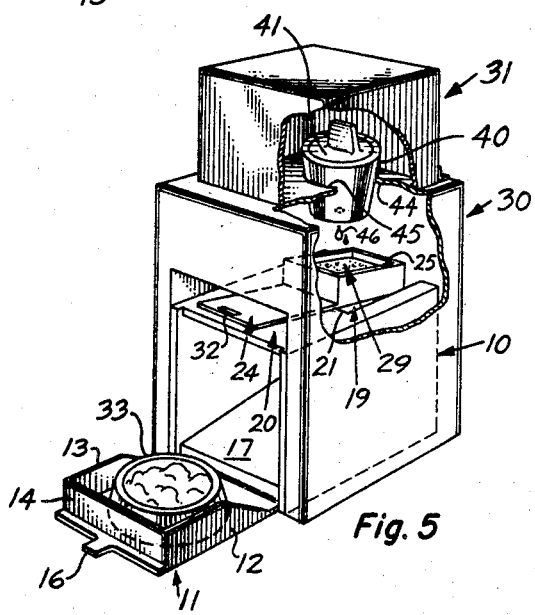
Figure 6:
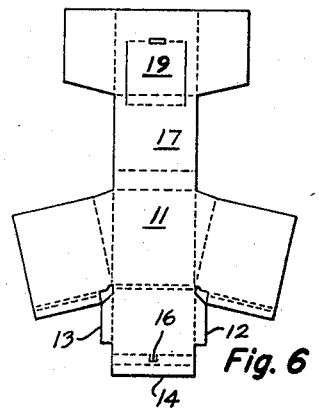

FIGURE 3, an open view of the dispenser proper to show the internal construction thereof;

FIGURE 4 is a perspective view of an ice-cup used in an embodiment of the invention;

FIGURE 5 is a partially cut-away view of the complete assembly of the dispenser, including a cover for the top thereof, in which all components of the dispenser are visible; and FIGURE 6 is an example of a foldable chamber in a developed blank form.

Figure 2:
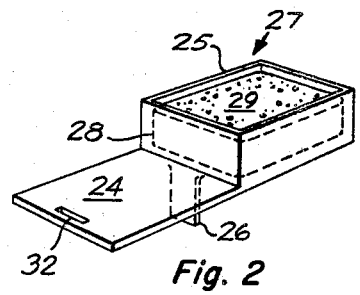
FIGURE 2 is a perspective view of one of the components of the dispenser disassembled from its mount.
Figure 1:
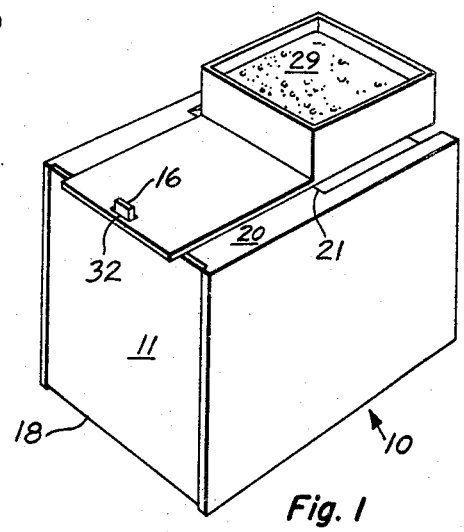
FIGURE 1 is a perspective view of the basic unit of the pet food dispenser of this invention.

Referring now to the figure generally, and in particular to FIGURES 1–3, the pet food dispenser of this invention can be seen to comprise a dispenser chamber 10 with an articulatible or hingable cover 11. Cover 11 has side walls 12 and 13 and an end wall 14. Cover 11 is hinged at the bottom 18 of chamber 10. A tab 16 extends from the top of cover 11. Within dispenser chamber 10 there is a sloping floor 17.

A sloping indentation 19 appears in the rear portion of the top 20 chamber 10. At the starting line 21 of the sloping indentation 19 in the center of top 20 a slot 22 is provided.

In FIGURE 2 a weighted lever hasp assembly 27 is shown removed from the assembly of FIGURE 1. Hasp assembly 27 includes a forward plate 24 and a rear hopper 25. From the junction 28 of hopper 25 and plate 24 there extends below the surface an articulation tab 26 designed to fit into slot 22. The tab 26 when inserted into slot 22 prevents the hasp assembly 27 from sliding but provides an articulation axis and support for the hasp assembly 27 so that if the weight of hopper 25 increases sufficiently over the weight of the forward plate 24, the hopper 25 will rock on the junction 28 raising plate 24 as may be seen in the cut-away area of the outer housing 30 of FIGURE 5.

In FIGURE 6 there is shown at $a$ a typical developed blank for the basic chamber 10 shown in FIGURE 3.

At $b$ there is shown a typical blank for the hopper 25 and hasp assembly 27.

The blanks for boxes 30 and 31 are shown at $c$ and $d$, respectively.

In FIGURES 1, 2 and 5 hopper 25 can be seen to contain a sponge 29 which will be explained further below.

Centrally, in the front of forward plate 24 of hasp assembly 27 a slot 32 is provided to receive tab 16 as may be seen in FIGURE 1.

When the weight of hopper 25 is great enough to lift plate 24, slot 32 clears tab 16 and front cover 11 falls. As shown in FIGURE 5, if a plate or bowl 33 of pet food is stored in chamber 10 it will slide down sloping floor 17 into the cover 11, now lying approximately on the same plane as the floor. The walls 12, 13, 14 prevent the bowl 33 from moving beyond their confines.

Referring now in particular to FIGURES 4 and 5, the mechanism of the timing means of my invention for determining when to release the food is shown in detail. First, a housing 30 with a top cover 31 are provided to enclose chamber 10 and hasp assembly 27, assembled together as shown in FIGURE 1.

The cup 40 shown in FIGURE 4 includes a cover 41 and has a small opening 42 in the bottom 43 thereof. Cup 40 may be filled with a fine sand so that after a period of time enough sand can run out of hole 42 into hopper 25 to weight it and release the cover to reveal the food. It has been found that this is satisfactory for short intervals. For longer periods such as a full day, for example, if the cup is filled with water on the previous evening, covered, and stored upside down in a refrigerator-freezer compartment it will become ice by morning and may be inserted in the hole 45 in the base 44 of cover 31 so that as the ice in cup 40 melts drops of water 46 fall onto sponge 29 placed in hopper 25 until the weight of the water tilts the hasp assembly 27, releasing cover 11 and dispensing the food to the animal.

While the items shown in the figures are preferred embodiment, there are many ways in which this invention can be implemented in the light of the above teaching which will occur to those skilled in the arts appertaining hereto.

All of the parts of the invention have been so devised that they can be fabricated from corrugated pasteboard and provided in knocked-down form to be economical and easily assembled. The pasteboard carton industry provides many techniques for such an implementation.

Alternatively, all parts may be fabricated from high impact plastics moulded in a form so that the fixed parts fit together tightly and the movable parts snap together easily.

There has been described herein above a timed dispenser for pet foods wherein the dispenser comprises a chamber normally locked by a weight-timed lock. The weight-timed lock may take the form of a sand-clock or a water-clock. In either case, the energy source for the clock is a cup such as 40 filled with a substance such as sand, water, or ice which is permitted to leak out of the cup through an aperture in the bottom such as 42, at a slow rate into a hopper such as 25 where the hopper forms part of a lever arm such as hasp assembly 27 to lift a locking slot such as 32 off of a tab such as 16 on the door such as 11 of a chamber such as 10 which contains a bowl or plate of food such as at 33. Releasing the door such as 11 permits the food to slide into view of the pet for his partaking thereof.

In FIGURE 6 there is shown a developed blank of a type which may be provided for the fabrication of a chamber such as 10 for use in the invention. Pasteboard or corrugated carton stock may be prepared in the form illustrated and then folded into the box chamber 10. The folds and principal panels are identified with the reference characters employed in the other figures.

What is claimed as new is:
1. A timed food dspensing system comprising:
   an inner housing having sides, a front cover, hinged at the bottom to said housing, a top of predetermined contour, and a bottom liftable to provide a sloping floor therein;
   a tab extending from said cover;
   a rockable hasp and hopper lever assembly positionable on said top and including a slot, one end forming the hasp fittable over said tab in said cover;
   the hopper thereof including means to receive substances to be deposited therein, the weight of said substances resulting in the weighting of said hopper to rock said lever assembly on said top so as to lift said hasp and release said tab whereby said cover will fall, articulating on the hinged end thereof;
   an outer housing having an inner support with an aperture therein to receive a dispensing cup having a small aperture in the bottom thereof, said cup being positionable over said hopper so that substances in said cup will discharge from said small aperture over a period of time to fill said hopper and thus, after said period of time, increase the weight of said hopper to release said cover as described,
   whereby a food plate in said inner chamber on the sloping floor thereof will slide out onto said front cover, now lying on the floor, to permit access thereto by an animal.

2. In the food dispenser defined in claim 1 the substances to be deposited being water in said means to receive substances, and said substance in said dispensing cup being ice, the melting of which over a period of time produces the water to be deposited in said receiving cup.

3. In the food dispensing system defined in claim 1 the substances being sand in said dispensing cup to be deposited over a predetermined period of time into said receiving cup.

References Cited

UNITED STATES PATENTS

| | | | |
|---|---|---|---|
| 967,517 | 8/1910 | Hart et al. | 119—51.11 |
| 1,029,623 | 6/1912 | Nieman | 119—56 |
| 1,112,918 | 10/1914 | Kuxmann et al. | 119—51.5 |
| 2,534,444 | 12/1950 | Hedwall et al. | 119—51.12 |

HUGH R. CHAMBLEE, Primary Examiner